Patented May 12, 1931

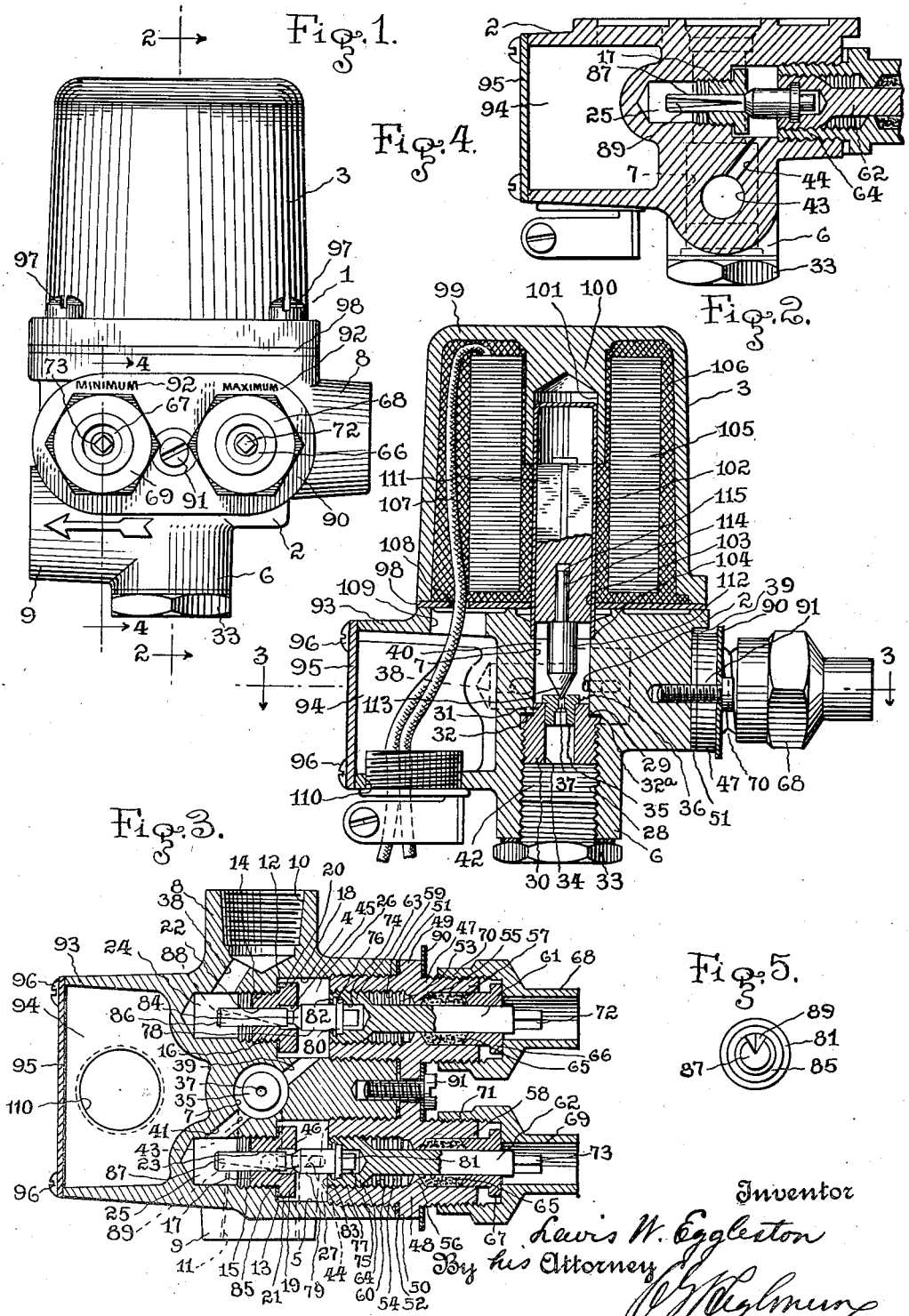

1,804,462

UNITED STATES PATENT OFFICE

LEWIS W. EGGLESTON, OF DETROIT, MICHIGAN, ASSIGNOR TO AMERICAN RADIATOR COMPANY, OF NEW YORK, N. Y., A CORPORATION OF NEW JERSEY

VALVE

Application filed June 16, 1928. Serial No. 285,803.

My invention relates to new and useful improvements in valves, and more particularly to automatically operated valves which act to permit a maximum or a minimum flow of fluid.

An object of my invention is to provide a valve which will act to automatically cut in or out certain flow passages.

Another object is to provide a valve having means to independently control the flow passages.

The invention consists in the improved construction and combination of parts to be more fully described hereinafter, and the novelty of which will be particularly pointed out and distinctly claimed.

In the accompanying drawings, to be taken as a part of this specification, I have fully and clearly illustrated a preferred embodiment of my invention, in which drawings—

Figure 1 is a view in side elevation;

Fig. 2 is a view in vertical central section on the line 2—2 of Fig. 1;

Fig. 3 is a view in horizontal section on the line 3—3 of Fig. 2;

Fig. 4 is a detail view, in vertical section, on the line 4—4 of Fig. 1, and

Fig. 5 is a detail end view of a valve.

Referring to the drawings by characters of reference, 1 designates a valve casing comprising a bottom casing member 2 and a top casing member 3. The bottom member 2 has substantially horizontal, parallel chambers 4, 5 which are preferably cylindrical and spaced laterally from each other. Depending centrally from the bottom wall of member 2 is a boss 6, and through the boss and the member 2 between chambers 4, 5 is a substantially vertical bore 7. In a vertical plane transverse to the longitudinal center line of the bore 7 are bosses 8, 9, which project from the member 2 and boss 6 respectively. The bosses 8, 9 have internally threaded bores 10, 11 respectively, which serve as inlet and outlet ports respectively. Substantially midway of the length of the chambers 4, 5, they are enlarged in diameter to form outwardly facing annular shoulders 12, 13 respectively, the walls of the chambers being threaded inwardly of the shoulders 12, 13, as at 14, 15, to receive externally threaded valve seat plugs 16, 17 respectively, having annular flanges 18, 19 which overlie the shoulders 12, 13 respectively, and seat tightly thereagainst to seal the plugs in the chambers. If desired, gaskets 20, 21 respectively may be inserted between the flanges 18, 19 and their respective shoulders 12, 13. Axially through plugs 16, 17 are passages 22, 23 respectively, forming valve ports. The plugs 16, 17 divide their respective chambers 4, 5 into inlet compartments 24, 25 and outlet compartments 26, 27, the inlet compartments 24, 25 being inwardly of the shoulders 12, 13. The lower portion of the bore 7 is enlarged in diameter, as at 28, to form a downward facing annular shoulder 29, which is substantially in the horizontal plane of the bottoms of the chambers 4, 5. Threaded into the lower portion 28 of the bore 7, is a sleeve 30, having an annular flange 31 which projects into bore 7 and forms a surrounding shoulder 32 which abuts the shoulder 29. A gasket 32ª may be inserted between shoulders 29 and 32 to seal the joint the lower open end of bore portion 28 is closed and sealed by a screw plug 33, or the like, threaded into the end of bore 7. Within the bore 34 of the sleeve 30, is a valve seat plug 35 having an annular surrounding flange 36 which overlies and abuts the end of flange 31, said plug being preferably inserted and held tightly in the bore 34 by solder. The plug 35 has a longitudinal, vertical bore 37 forming a valve port. The plug 35 is preferably made of a steel having about 18% nickel and 7% chromium, which renders the valve seat non-magnetic, and further provides a seat which has high wearing and shock resisting qualities. From the inlet port 10 leads a passage 38 which opens into the compartment 24, and from the outlet compartment 26 leads a passage 39 which opens into the bore 7 above the plug 35, and on the inlet side 40 thereof. From the inlet side 40 of bore 7 a passage 41 leads to the inlet compartment 25. From the bore 7 below the plug 35 and on the outlet side 42 thereof, a passage 43 leads to the outlet port 11. From the outlet compartment 27 a passage 44 leads to outlet passage 43. The passages 22, 23 through plugs 16, 17 are enlarged in diameter at their outer ends in the compartments 26, 27 respectively, as at 45, 46, for a purpose to be described. Threaded into the outlet compartments 26, 27 are bonnets 47, 48 respectively, having laterally projecting surrounding flanges 49, 50 which are adapted to seat tightly against the outside wall of the casing member 2. Gaskets 51, 52 may be inserted between the flanges 49, 50 and the casing member 2 to seal the joints. Longitudinally through the bonnets 47, 48 are bores 53, 54 having substantially midway of their lengths internal annular flanges 55, 56 providing packing recesses 57, 58 at the outer ends of the bonnets. Inwardly of the flanges 55, 56 the bores 53, 54 are internally threaded, as at 59, 60. Projecting through the center opening of the annular flanges 55, 56 are valve operating members 61, 62 respectively, having at their inner ends heads 63, 64 respectively, which are externally threaded for engagement with threads 59, 60. Within each of the recesses 57, 58 is packing 65 which is compressed by follower members 66, 67 and hollow nuts 68, 69 which are threaded over the ends of the bonnets 47, 48, as at 70, 71 respectively. The ends of the operating members 61, 62 are preferably square or polygonal, as at 72, 73, to receive a key, or the like, for screwing the members 61, 62 inward or outward. The heads 63, 64 have longitudinal end recesses 74, 75 which are enlarged adjacent their open ends to provide inwardly facing shoulders 76, 77. Within each of the recesses 74, 75 is one end of a valve stem 78, 79, the stems having surrounding flanges 80, 81 respectively which seat against the shoulders 76, 77 respectively. The stems 78, 79 are freely rotatable in the recesses 74, 75, but are positively held therein against endwise play in any suitable manner, as by burnishing over the annular ends of the heads, as at 82, 83. The stems 78, 79 are of greater diameter than the recesses 45, 46, and are provided with conical valve portions 84, 85 respectively, adapted to seat on the circular edges of the recesses to close and seal the valve ports or passages 22, 23 respectively. Projecting from the stems 78, 79 are cylindrical valves or valve portions 86, 87 which project through the passages 22, 23 respectively, and which have tight sliding fits therein. Longitudinally of the portion 86 is a metering groove 88, preferably V-shaped in cross-section, and of a depth at the free end of portion 86 substantially equal to the diameter of said portion, from which it gradually and continuously decreases in depth to a point on the circumference of the portion which is at the base of recess 45 when the conical portion 84 is seated on the surrounding edge of the recess. The cylindrical valve portion 87 is also provided with a metering groove 89, similar to groove 88, except that its maximum depth at the free end of portion 87 is substantially half that of the groove 88, or equal to the radius of the portion 87. The base of the groove 88 preferably forms an angle of substantially 16½ degrees with the axis of valve 86, while groove 89 preferably forms an angle of substantially 10 degrees with the axis of valve 87. A plate 90 having suitably spaced apertures for passage of the bonnets 47, 48 therethrough and which seats on the flanges 49, 50 may be secured to the casing member 2 by a screw 91, or the like, and carry suitable legends 92 to indicate which of the valves 86, 87 controls maximum and which controls minimum flow. Projecting from the opposite side of the member 2 from the bosses 8, 9, is a flange 93, preferably rectangular and forming a chamber 94. The open side of the chamber 94 may be closed by a cover member 95 removably secured thereto by screws, or the like, 96.

The top casing member 3 is mounted on the bottom casing member 2 and is secured thereto by screws, or the like, 97. A plate 98 may be inserted between the members 2 and 3 to serve as a base for the member 3. From the top wall 99 of member 3 depends a cylindrical boss 100, having a substantially cylindrical vertical recess 101 which is in the axial line of valve port 37. Within the recess 101 is one end of a sleeve or tubular guide 102 which extends downwardly therefrom through an aperture 103 in plate 98, and seats on an annular shoulder 104, to which the guide is sealed and fixed by solder, or the like, and which is formed by enlarging the upper end of the bore 7. Surrounding the guide 102 and within the casing member 3, is a solenoid winding 105 which is secured therein by any suitable cementing material 106, which is preferably both water and acid proof. From the solenoid winding 105 adjacent top wall 99, run electric leads 107 which are sealed in the material 106, and which pass through apertures 108, 109 in the plate 98 and casing member 2 respectively, into the chamber 94, and therefrom through an aperture 110 in flange 93. By sealing the leads 107 in the material 106, for the length of the winding, said leads are sustained and unmovable in the top casing member, and thus prevented from being pulled loose from the winding. Within the tubular guide 102 is a solenoid core 111 which is preferably rectangular, and depending centrally therefrom is a valve member 112 of less diameter than bore 7, having its free end 113 in the form of a conical needle valve, which when the solenoid is deenergized seats by gravity on the plug 35 to close the valve port 37. The valve member 112 is preferably rigidly secured to the core 111 by a shank 114 having a drive fit in an axial recess 115 in the core 111. The solenoid 105 and core 111 together form a motor means for operating the valve.

The operation of my valve is as follows: The valve 1 is connected by means of the inlet port 10 and the outlet port 11 in a fluid conveying conduit or pipe line (not shown), such, for example, as the feed line to an oil burner, or the like, wherein it is desired, during the period or season of operation of the oil burner, to have at all times a minimum flow of fuel to maintain a pilot burner light, and also to have a maximum flow of fuel to supply a main burner at certain times or intervals during the period of operation. The leads 107 are connected to any suitable control means (not shown) whereby the solenoid 105 will be energized during the time that it is desired to have maximum flow of fuel through the conduit and valve to supply the main burner, and will be deenergized when the main burner is to be stopped. With the solenoid energized, a key or wrench is applied to the polygonal portion 72 of operating member 61 and the valve 86 is opened until the passage through port 22 and V-shaped groove 88 will supply sufficient fuel to maintain the maximum desired flame at the main burner. The solenoid is then deenergized, permitting valve 113 to close port 37, and the key or wrench is applied to polygonal portion 73 of member 62, and valve 87 is opened to permit the minimum supply of fuel which will maintain the pilot burner lighted. The above adjustments having been made, it is apparent that with the solenoid 105 deenergized, the valve 113, due to the weight of core 111, will maintain port 37 closed, and fuel entering inlet 10 will flow through passage 38, groove 88, passage 39, compartment 40 above seat 35, and passage 41 to groove 89, where the flow will be restricted by the minimum flow permitted by metering groove 89 and port 23. The fuel passing the valve 87 will then flow into chamber 27 and via passages 44 and 43 to the outlet 11 and the pilot burner (not shown). It is evident that the ports and passages just described which are between the compartment 40 and outlet 11, serve as a by-pass to permit flow of fuel around valve 113. When the solenoid 105 is energized, however, it will act on the core 111 to lift the valve 113 from its seat on plug 35 to open port 37. Since the port 37 is sufficiently large to accommodate the greatest flow which is possible through port 22, the flow of fuel which is restricted by valve 87 will pass through port 37 and passage 44 to the outlet 11, and thence to the oil burner to supply the main burner thereof. When the period or season of operation of the oil burner is over or past, the valve may be tightly closed by screwing the valves 86, 87 inward until the conical portions 84, 85 seat on the circumferences of the recesses 45, 46 respectively.

It is apparent that I have provided a valve for controlling flow of fluid, whether liquid or gaseous, which comprises means to regulate the flow within maximum and minimum limits, and to automatically permit or prevent the maximum flow with means independent of the automatic means for preventing either maximum or minimum flow.

What I claim and desire to secure by Letters Patent of the United States is:—

1. A valve of the character described, comprising a casing having an inlet and an outlet connected by a passage through said casing, valve seat means in said passage, a valve operative to seat on said means to close said passage, means to open and close said valve, a reciprocable valve having a metering slot and positioned in said passage between said inlet and said first valve, said casing having a by-pass leading from said passage between said valves to said outlet, and a reciprocable valve in said by-pass.

2. A valve of the character described, comprising a casing having an inlet and an outlet connected by a passage through said casing, valve seat means in said passage, a valve operative to seat under force of gravity on said means to close said passage, said valve having a stem comprising a solenoid core, a solenoid winding in said casing around said core whereby energization of said solenoid opens said valve, a metering valve in said passage between said inlet and said first valve, said casing having a by-pass leading from said passage between said valves to said outlet, and a metering valve in said by-pass.

3. A valve of the character described, comprising a casing, a plurality of chambers in said casing, a partition dividing each of said chambers into an inlet compartment and an outlet compartment, a valve port through each of said partitions, a valve in each chamber adapted to close the valve port therein, one of said valves extending through its port and having a metering slot cooperable with the wall of its port to meter flow therethrough, said casing having an inlet passage opening into the inlet compartment of one of said chambers, said casing having an outlet passage from the outlet compartment of another of said chambers, and a passage connecting the outlet compartment of said one chamber to the inlet compartment of said other chamber.

4. A valve of the character described, comprising a casing, a plurality of chambers in said casing, a partition dividing each of said chambers into an inlet compartment and an outlet compartment, a valve port through each of said partitions, a valve in each chamber adapted to close the valve port therein, said casing having an inlet passage opening into the inlet compartment of one of said chambers, said casing having an outlet, an outlet passage from the outlet compartment of a second chamber to said casing outlet, an outlet passage from the outlet compartment of a third chamber to said casing outlet, a passage from the outlet compartment of said one chamber to the inlet compartment of said second chamber, and a passage from the inlet compartment of said second chamber to the inlet compartment of said third chamber.

5. A valve of the character described, comprising a casing having an inlet and an outlet, said casing having substantially parallel spaced chambers and a chamber between said first chambers extending transversely thereto, each of said chambers having a partition dividing said chambers into inlet and outlet compartments, said partitions each having an aperture therethrough, a valve in each chamber operative to close one of said apertures, a passage from said casing inlet to the inlet compartment of one of said parallel chambers, a passage from the outlet compartment of said one parallel chamber to the inlet compartment of said transverse chamber, a passage from the inlet compartment of said transverse chamber to the inlet compartment of another of said parallel chambers, a passage from the outlet compartment of said transverse chamber to the casing outlet, and a passage from the outlet compartment of said other parallel chamber to the casing outlet.

6. A valve of the character described, comprising a casing having a hollow top casing member and a bottom casing member, said bottom member having a bore therethrough, said top member having a boss therein and depending from the top wall thereof, said boss having a recess concentric with said bore, a sleeve having its opposite ends positioned in said recess and in said bore, a valve seat member positioned in said bore and having a valve port, a plug closing said bore below said valve seat member, said bottom member having a passage opening into said bore above said seat member and a second passage opening into said bore below said seat member, a solenoid winding in said top casing member and surrounding said boss and sleeve, and a valve operative to close said valve port and comprising a solenoid core positioned within said sleeve whereby energization of said solenoid lifts said valve to open said port.

7. A valve of the character described, comprising a casing having a hollow top casing member and a bottom casing member, said bottom member having a bore therethrough, said top member having a boss therein and depending from the top wall thereof, said boss having a recess concentric with said bore, a sleeve having its opposite ends positioned in said recess and in said bore, a valve seat member positioned in said bore and having a valve port, a plug closing said bore below said valve seat member, said bottom casing member having a passage opening into said bore above said seat member and a second passage opening into said bore below said seat member, a solenoid winding in said top casing member and surrounding said boss and sleeve, a valve operative to close said valve port and comprising a solenoid core positioned within said sleeve whereby energization of said solenoid lifts said valve to open said port, and means to control the flow through said valve port.

8. A valve of the character described, comprising a casing having a hollow top casing member and a bottom casing member, said bottom member having a bore therethrough, said top member having a boss therein and depending from the top wall thereof, said boss having a recess concentric with said bore, a sleeve having its opposite ends positioned in said recess and in said bore, a valve seat member positioned in said bore and having a valve port, a plug closing said bore below said valve seat member, said bottom member having a passage opening into said bore above said seat member and a second passage opening into said bore below said seat member, a solenoid winding in said top casing member and surrounding said boss and sleeve, a valve operative to close said valve port and comprising a solenoid core positioned within said sleeve whereby energization of said solenoid lifts said valve to open said port, a by-pass around said valve from said first passage to said second passage, means to control the flow through said valve port, and means to control the flow through said by-pass.

9. A burner control means adapted to be positioned in the fuel supply line to a burner, comprising a conduit, valve means in said conduit and having a metering slot and regulatable to determine the maximum fuel flow to the burner, valve means in said conduit and having a metering slot and regulatable to determine the minimum fuel flow to the burner, a second conduit having one end in communication with said first conduit between said valve means and having its other end in communication with said first conduit beyond said second valve means, and electrically operated valve means operable in one position to permit fuel flow through both said conduits and operable in another position to prevent fuel flow through one of said conduits.

10. A burner control means adapted to be positioned in the fuel supply line to a burner, comprising a conduit, a plurality of spaced valve seat members in said conduit providing valve ports, a valve member having a reciprocable sliding fit in each of said ports, said valve members having metering slots whereby to meter flow through said ports and provide maximum and minimum flow to the burner, a second conduit having one end in communication with said first conduit between certain of said seat members and having its other end in communication with the outlet end of said first conduit, and valve means operable to permit or prevent flow through said second conduit.

11. A burner control means adapted to be positioned in the fuel supply line to a burner, comprising a conduit, a plurality of spaced valve seat members in said conduit providing valve ports, a valve member having a reciprocable sliding fit in each of said ports, said valve members having metering slots whereby to meter flow through said ports and provide maximum and minimum flow to the burner, one of said valve members having means to seat on its valve seat member to cut off flow through said first conduit, a second conduit having one end in communication with said first conduit between certain of said seat members and having its other end in communication with the outlet end of said first conduit, and valve means operable to permit or prevent flow through said second conduit.

In testimony whereof I have hereunto signed my name.

LEWIS W. EGGLESTON.